United States Patent [19]

Neely, Jr.

[11] 4,312,673

[45] * Jan. 26, 1982

[54] MIXED ALKALI SILICATE COMPOSITIONS FOR COATINGS AND CEMENTS

[75] Inventor: James E. Neely, Jr., Butler, Pa.

[73] Assignee: PPG Industries, Inc., Pittsburgh, Pa.

[*] Notice: The portion of the term of this patent subsequent to Aug. 5, 1997, has been disclaimed.

[21] Appl. No.: 142,299

[22] Filed: Apr. 21, 1980

Related U.S. Application Data

[63] Continuation of Ser. No. 973,480, Dec. 26, 1978, abandoned.

[51] Int. Cl.³ .............................................. C09D 1/02
[52] U.S. Cl. ................................................... 106/74
[58] Field of Search ..................................... 106/74, 84

[56] References Cited

U.S. PATENT DOCUMENTS

| | | | |
|---|---|---|---|
| 2,372,284 | 3/1945 | Marc | 117/126 |
| 2,662,022 | 12/1953 | Dietz | 106/74 |
| 3,178,299 | 4/1965 | Wilborn | 106/74 |
| 3,445,257 | 5/1969 | Hloch et al. | 106/84 |
| 3,454,410 | 7/1969 | Schutt et al. | 106/74 |
| 3,639,276 | 2/1972 | Mueller | 106/74 |
| 3,930,876 | 1/1976 | Nakajima et al. | 106/74 |
| 3,943,231 | 3/1976 | Wasel-Nielen et al. | 106/74 |
| 4,216,190 | 8/1980 | Neely | 423/314 |

*Primary Examiner*—James Poer
*Attorney, Agent, or Firm*—Donna L. Seidel

[57] ABSTRACT

Water-soluble, curable silicate compositions comprising sodium silicate and potassium silicate for use as coatings or cements are disclosed.

4 Claims, No Drawings

MIXED ALKALI SILICATE COMPOSITIONS FOR COATINGS AND CEMENTS

CROSS REFERENCE TO RELATED APPLICATION

This application is a continuation of U.S. Application Ser. No. 973,480 filed Dec. 26, 1978, now abandoned.

FIELD OF THE INVENTION

The present invention relates generally to the art of curable alkali silicate coating compositions and more particularly to compositions comprising a mixture of alkali silicates.

THE PRIOR ART

U.S. Pat. No. 2,372,284 to Marc relates to cement products coated with potassium silicate. The potassium silicate is applied as a solution wherein the ratio of $K_2O$ to $SiO_2$ is about 1 to 3.7 and is cured by heating to about 500° F. for about 15 minutes. The presence of sodium silicate may be tolerated in small amounts, but its presence even in small amounts is disclosed to be somewhat disadvantageous.

U.S. Pat. No. 3,930,876 to Nakajima et al discloses an improved silicate-phosphate type inorganic coating composition comprising a water soluble silicate and an inorganic phosphate pretreated with such silicate.

SUMMARY OF THE INVENTION

The present invention relates to curable compositions comprising a mixture of alkali silicates and an inorganic curing agent. By providing a range of sizes of alkali metal cations and silicate anions, a composition is obtained which is less porous and more chemically stable than compostions comprising a single alkali metal silicate. The mixed alkali silicate compositions of the present invention are useful as paints or cements in a wide variety of applications such as protective coatings for metal films on architectural spandrels, as solar collector coatings or as water stable cements for joining glass panes in a multiple glazed window unit.

DESCRIPTION OF THE PREFERRED EMBODIMENT

A composition is prepared comprising a mixture of alkali metal silicates. Preferably the mixture comprises sodium silicate and potassium silicate, although other cations such as lithium or ammonium may also be present. Preferred sodium silicates have $SiO_2/Na_2O$ mole ratios between 3.1 and 4.0 while preferred potassium silicates have $SiO_2/K_2O$ mole ratios between 3.3 and 4.0.

The composition further comprises an inorganic curing agent, i.e., a compound which effects crosslinking of the silicate anions resulting in the hardening of the composition. Useful curing agents include zincates, borates and phosphates. A preferred curing agent is the B-form of $Al(PO_3)_3$, aluminum trimetaphosphate, preferably prepared according to the method disclosed in U.S. Pat. No. 4,216,190, which disclosure is incorporated herein by reference.

The mixture of alkali silicates preferably comprises from about 25 to 75 weight percent sodium silicate having a $SiO_2/Na_2O$ ratio of about 3.85 by weight and from about 75 to 25 weight percent potassium silicate having a $SiO_2/K_2O$ ratio of about 2.5 by weight. Preferably the ratio of silicate to phosphate curing agent is above about 2.5 by weight, and for a cementitious composition, more preferably above about 5. Generally, fillers are added to the silicate/phosphate composition in order to provide desired properties. Pigments are desirably included. Typical compositions may comprise 20 to 60 percent fillers such as silica, mica, phosphates, or pigments such as $TiO_2$ or $Cu(CrO_2)_2$. Sufficient water is used to give the compound the consistency desired for a particular method of application. Preferred application and curing conditions are disclosed in U.S. Ser. No. 142,492 filed on even date herewith, which disclosure is incorporated herein by reference.

The invention will be further understood from the descriptions of specific examples which follow:

EXAMPLE I

A cementitious composition is prepared as follows. A mixture of 100 grams of potassium silicate, 50 grams of sodium silicate and 45 grams of mica is placed in a one-liter ball mill and mixed with 10 milliliters of water for 5 minutes. The potassium silicate is a 29.1 percent aqueous solution of potassium silicate having a mole ratio of 3.9 $SiO_2/K_2O$. The sodium silicate is a 41.2 percent solution of sodium silicate having a mole ratio of 3.1 $SiO_2/Na_2O$. A mixture of 29.7 grams of a 50 percent aqueous solution comprising the B-form of $Al(PO_3)_3$, aluminum trimetaphosphate, and 4 milliliters of concentrated potassium hydroxide solution (1 gram of KOH per gram of $H_2O$) is added to the silicate mixture in the ball mill. After 5 minutes of milling, a uniform lump-free cementitious composition is obtained. The composition comprises 38 percent filler and has a silicate/phosphate ratio of 4.

EXAMPLE II

A cementitious composition is prepared by milling together a mixture comprising 100 grams of potassium silicate, 50 grams of sodium silicate and 5 milliliters of water as in Example I and 40 grams of a blue cobalt/aluminum oxide pigment and a mixture of 19.8 grams of solid comprising predominantly the B-form of aluminum trimetaphosphate and 3.5 milliliters of concentrated ammonium hydroxide solution. After ball milling, the composition can be applied as a cement or can be thinned with water for application as a paint.

EXAMPLE III

A cementitious composition is prepared comprising 100 grams of potassium silicate, 50 grams of sodium silicate, 50 grams of mica, 30 milliliters of water as in Example I and 19 grams of curing agent solution containing 9.9 grams of aluminum trimetaphosphate. After 30 minutes of ball milling, a uniform lump-free cement having 42 percent filler and a silicate/phosphate ratio of 6 is obtained.

EXAMPLE IV

A cementitious composition is prepared in the manner described in Example III from the following components: 20.9 grams of hardener solution containing 9.9 grams of aluminum trimetaphosphate, 133.3 grams of potassium silicate solution containing 38.8 grams of potassium silicate having a mole ratio of 3.92 $SiO_2/K_2O$, 63.4 grams of sodium silicate solution containing 20.6 grams of sodium silicate having a mole ratio of 3.85 $SiO_2/Na_2O$ and 30 grams of mica.

The above examples are offered to illustrate the present invention. Although the compositions described in detail have a consistency typical of cements, simple addition of water lowers the consistency to that of typical paints for application by conventional methods such as brushing or spraying. While the preferred hardener for cement compositions comprises a very high proportion of the B-form of $Al(PO_3)_3$, typically greater than 70 percent, and preferably about 80 to 90 percent, the preferred hardener for paint compositions comprises about 50 to 70 percent, preferably about 60 percent, of the B-form of $Al(PO_3)_3$. The scope of the present invention is defined by the following claims.

I claim:

1. A method for preparing an aqueous, curable silicate composition comprising the steps of:
   a. reacting aluminum dihydrogen phosphate with an ammonia compound to form a reaction product;
   b. heating said reaction product to a sufficient temperature for a sufficient time to produce predominantly the B-form of aluminum trimetaphosphate; and
   c. adding said heat treated reaction product to a mixture consisting essentially of sodium silicate and potassium silicate in aqueous solution.

2. The method according to claim 1, wherein the mixture of alkali metal silicates comprises from 25 to 75 percent by weight sodium silicate and from 25 to 75 percent by weight potassium silicate.

3. The method according to claim 2, wherein the sodium silicate has a mole ratio of $SiO_2/Na_2O$ between 3.1 and 4.0 and the potassium silicate has a mole ratio of $SiO_2/K_2O$ between 3.3 and 4.0.

4. The method according to claim 3, wherein the ratio of silicate to phosphate is at least about 2.5:1 by weight.

* * * * *